Dec. 9, 1930.  H. T. KRAFT  1,784,733
STEERING WHEEL
Filed Oct. 12, 1929  2 Sheets-Sheet 1

INVENTOR
HERMAN T. KRAFT
BY
Evans & McCoy
ATTORNEYS

Dec. 9, 1930.                    H. T. KRAFT                    1,784,733
STEERING WHEEL
Filed Oct. 12, 1929        2 Sheets-Sheet 2
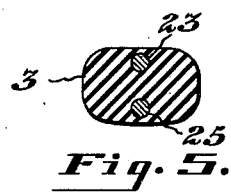
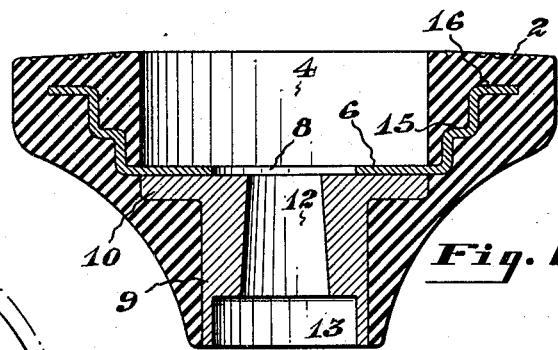
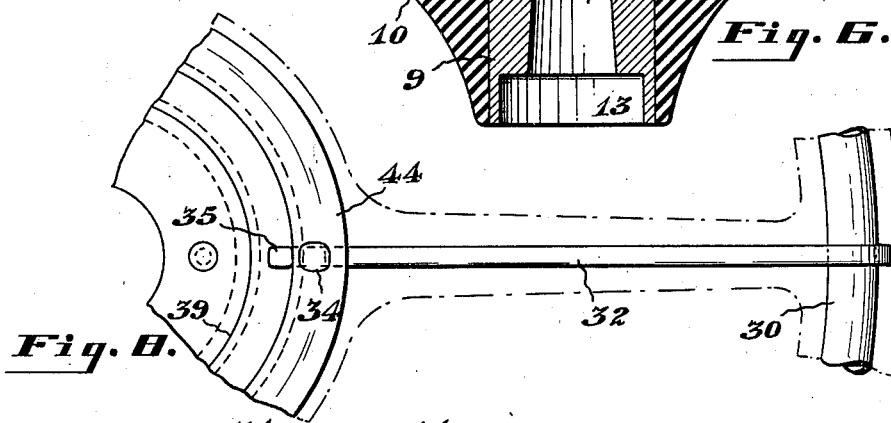
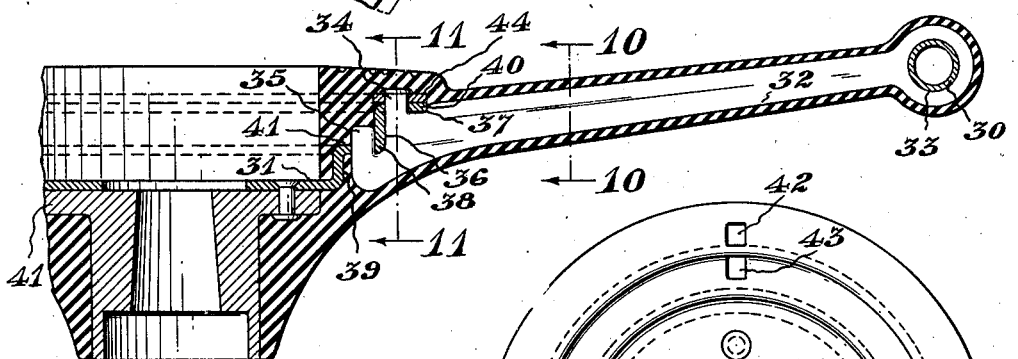
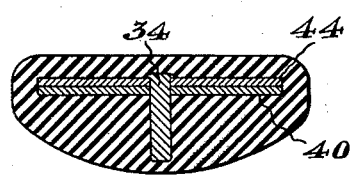
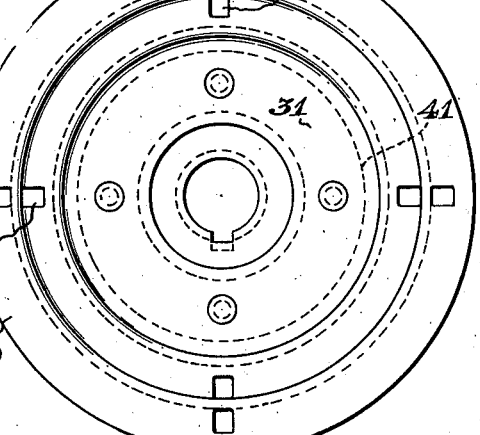
INVENTOR
HERMAN T. KRAFT
BY
Evans & McCoy
ATTORNEYS Patented Dec. 9, 1930

1,784,733

UNITED STATES PATENT OFFICE

HERMAN T. KRAFT, OF AKRON, OHIO, ASSIGNOR TO THE H. A. HUSTED COMPANY, OF DETROIT, MICHIGAN, A CORPORATION OF MICHIGAN

STEERING WHEEL

Application filed October 12, 1929. Serial No. 399,208.

This invention relates to steering wheels and particularly to steering wheels of the reinforced composition type.

One of the objects of the present invention is to provide a reinforced composition steering wheel of new and novel construction which can be very economically manufactured.

Another object is to provide a composition steering wheel having a rigid and economical reinforcing spider embedded therein.

Another object is to provide a steering wheel of composition material having spoke reinforcing members of strut-like formation.

A further object is to provide a composition steering wheel having a metallic hub reinforcing member and spoke reinforcing members, with a new and novel means for attaching the spoke reinforcing members to the hub reinforcing member.

With the above and other objects in view, the invention may be said to comprise the method and apparatus as illustrated in the accompanying drawings hereinafter described and particularly set forth in the appended claims, together with such variations and modifications thereof as will be apparent to one skilled in the art to which the invention appertains.

In the accompanying drawings which illustrate suitable embodiments of the present invention, Figure 1 is a plan view of the reinforced composition steering wheel, portions of the composition material being broken away to clearly show the reinforcing members.

Fig. 5 is an enlarged transverse section of one of the spokes taken substantially on the line 5—5 of Fig. 2.

Fig. 6 is an enlarged sectional view of the reinforcing hub taken on the line 6—6 of Figure 1.

Fig. 7 is a transverse section of a steering wheel having a modified spoke reinforcing member.

Fig. 8 is a partial plan view of the assembled spoke, hub and rim reinforcing members shown in Fig. 7.

Fig. 9 is a plan view of the hub reinforcing member shown in Fig. 7.

Fig. 10 is an enlarged transverse section of one of the spokes taken on the line 10—10 of Fig. 7.

Fig. 11 is an enlarged section taken on the line 11—11 of Fig. 7.

Figure 1:
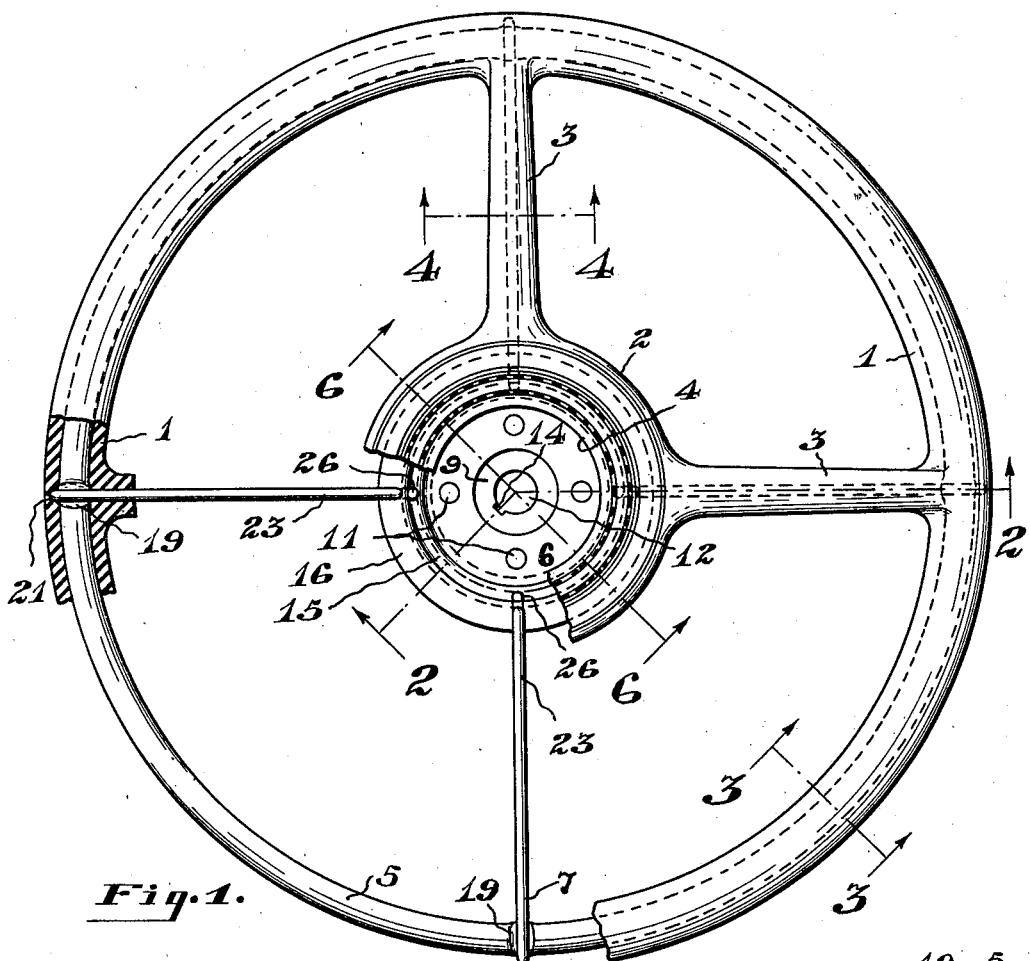
Figures 2, 3, 4:
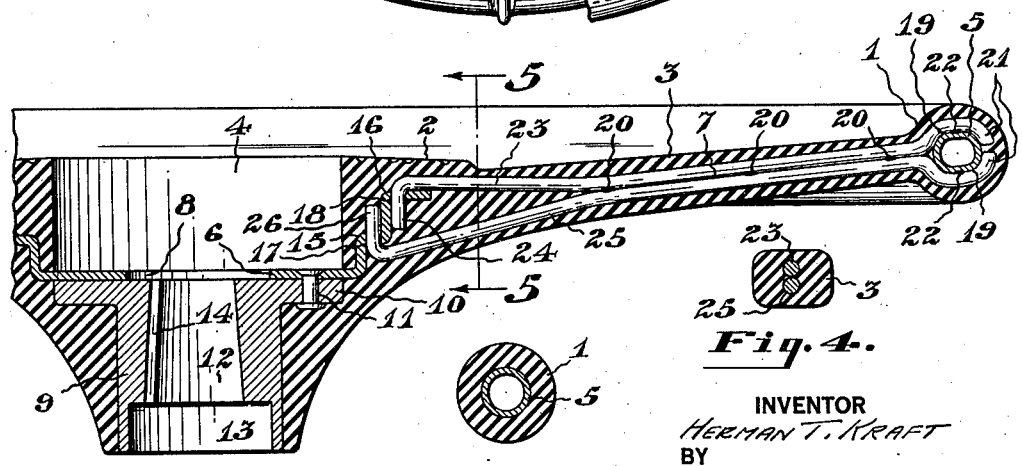
Fig. 2 is an enlarged transverse section of the steering wheel taken substantially on the line 2—2 of Fig. 1, showing how the spoke reinforcing members are attached to the rim and hub reinforcing members.
Fig. 3 is an enlarged section of the rim taken substantially on the line 3—3 of Fig. 1.
Fig. 4 is an enlarged transverse section of one of the spokes taken substantially on the line 4—4 of Fig. 1.

Referring to the accompanying drawings in which like numerals refer to like parts throughout the several views, the steering wheel of the present invention comprises a rim 1, an annular hub portion 2 and a plurality of spokes 3 integrally connecting the rim 1 and hub 2. The spokes 3, rim 1 and hub 2 are formed of a suitable initially plastic composition material, such as hard rubber compound, and are integrally molded to present a unitary structure of neat and pleasing appearance. The hub 2, as shown in Figs. 1 and 2, is preferably formed with a relatively deep central cup-shaped depression 4 for receiving, when used in connection with a motor vehicle, such control mechanism as a horn button, gas, spark and light control levers and the like. It is obvious that such equipment can extend into the depression 4 so that the upper surfaces thereof will be substantially flush with the upper surface of the hub 2 of the wheel with the result that these items will not extend above the plane of the rim 1 and catch the clothing of the operator of the vehicle. The wheel is also preferably dished with the spokes 3 inclining downwardly to the hub so that added strength is imparted thereto.

The wheel is provided with a metallic reinforcing spider completely embedded therein comprising a reinforcing rim 5, a reinforcing hub 6 and a plurality of reinforcing spokes 7. The hub 6 as shown in Figs. 2 and 6, is formed to a cup shape from a single piece of sheet metal and is provided with a central opening 8 and a separately formed hub member 9 rigidly secured thereto and also embedded in the composition material of the hub 2.

This hub member 9 may be cast, forged, or formed in any suitable manner and is provided at its upper end with a circumferential flange 10 which is concentrically rigidly secured to the lower face of the reinforcing hub 6 by means of rivets 11 or suitable bolts and the like. A central tapered opening 12 having a counterbored lower end 13 is formed in the hub member 9 axial with the opening 8 of the reinforcing hub 6 and a keyway 14 is also formed in the tapered opening 12. The steering shaft (not shown) of the vehicle to which the steering wheel of the present invention is assembled, extends upwardly through the tapered hub opening 12 and a suitable key which extends into the keyway 14 is provided to hold the shaft and wheel against relative rotation. A conventional nut is threaded on the projecting end of the steering shaft to bear against the upper face of the hub 9 or the reinforcing hub 6 to prevent axial movement of the wheel on the steering shaft.

The reinforcing hub 6 is formed with a continuous annular upwardly extending wall which is offset to form an annular horizontal shelf or shoulder 15, and the extreme upper end of this wall is formed with a continuous horizontal flange 16 extending outwardly therefrom. The shoulder 15 is preferably formed, for a purpose which will be later described, with a plurality of openings 17 positioned on the vertical axes of the spokes 3 and are of a diameter equal to the distance between the vertical offset portions of the vertical wall of the reinforcing hub 6. The flange 16 is also provided with similar openings 18 positioned on the vertical axes of the spokes 3.

The reinforcing rim 5 is formed of a piece of metal tubular stock bent into the form of a continuous ring having its ends welded together to hermetically seal the same. The upper and lower surfaces of the reinforcing rim 5 are preferably formed with opposite spoke receiving depressions 19 which, like the hub openings 17 and 18 just described, are positioned substantially on the vertical axes of the spokes 3.

The reniforcing spokes 7 each comprise a pair of wire or bar elements which are welded or otherwise secured together at a number of spaced points 20. These spoke elements are arranged in a vertical plane and the outer ends 21 thereof are bent away from each other and are bent around the rim 5 and securely seated in the depressions 19 which prevent relative movement between the reinforcing rim and spokes. The ends 21 of the spoke elements are also preferably welded at 22 to the bottoms of the rim depressions 19. This, however, is not essential, but it is obvious that a much stronger construction results when the reinforcing rim and spokes are rigidly secured together.

Referring to Fig. 2 the inner end 23 of each upper spoke element is bent upwardly above the reinforcing hub flange 16 and is then perpendicularly bent to provide a vertical leg 24 which extends downwardly through the flange opening 18 and abuts against the outer face of the outermost portion of the vertical wall of the reinforcing hub 6. The inner end 25 of the lower spoke element is similarly bent downwardly away from the upper spoke element and is formed with an upwardly extending vertical leg 26 which extends upwardly through the opening 17 in the shoulder 15 and abuts against the opposite face of the outermost vertical wall portion of the reinforcing hub 6. This portion of the lowermost spoke element also abuts against the outer face of the innermost portion of the reinforcing hub wall.

The corners between the vertical legs 24 and 26 and the spoke element ends 23 and 25 respectively, are preferably made very sharp so that the ends 23 and 25 can firmly seat against the horizontal portions 16 and 15 respectively of the reinforcing hub 6 and be securely welded or otherwise rigidly attached thereto.

It is to be particularly noted in Fig. 2 that the spoke elements are securely tied together intermediate their ends, and that their inner ends 23 and 25 are divergently spaced from each other and securely attached to the hub reinforcing member 6 with the vertical legs 24 and 26 abutting against vertical portions of the hub reinforcing member. The spoke reinforcing members 7 consequently serve as struts because of the spaced inner ends which embody tension and compression portions, and it is clearly obvious that because of the connection between the spoke elements and the hub reinforcement 6, considerable strength and rigidity is imparted to the wheel.

The reinforcement spider is built up in the manner just described, then supported in a suitable mold and the initially plastic composition material is molded around the same.

The composition material completely embeds the reinforcing rim 5, spokes 7 and the connection between the spokes and reinforcing hub 6, and also extends completely around the separately formed hub member 9, as shown in Fig. 6.

Referring to Figs. 7 to 11, inclusive, a modified reinforcing spider is shown to comprise a tubular rim 30, a sheet metal cup-shaped hub 31, and a plurality of spokes 32 connecting the reinforcing rim 30 and reinforcing hub 31, similar to that shown in Fig. 6.

The spokes 32 in this modified construction are stamped from sheet metal and formed with an opening 33 at their outer ends through which the tubular rim 30 extends. The inner end of each spoke 32 is provided with a pair of parallel lugs or prongs 34 and 35 arranged flat-wise thereof and separated from each other by a narrow slot 36. A narrow slot 37 is also provided adjacent the prong 34, which prong extends beyond the adjacent side edge of the spoke.

The hub reinforcing member 31 is formed to a cup shape from a single piece of sheet metal and has a stepped or offset vertical wall having outer and inner vertical portions 38 and 39, respectively, and also having an outer horizontal flange 40 at the edge of the portion 38. A separately formed hub member 41 similar to the one shown in Fig. 6 is also secured to the reinforcing hub member 31.

In assembling the modified reinforcing spider, the spokes 32 are positioned on the tubular rim 30 before the ends of the rim are welded together. The ends of the rim 30 are then welded together and the hub reinforcing member 31 is secured to the spokes 32.

It will be noted in Fig. 7 that in assembled position the flat side faces of the spokes 32 are positioned axially of the wheel. The flange 40 and the shoulder 41 provided by the offset wall are provided with rectangular openings 42 and 43, respectively, through which the prongs 34 and 35 extend. The outer wall portion 36 of the hub reinforcing member 31 very closely fits within the notches 36 between the prongs 34 and 35 of the spokes, and that portion of the hub flange 40 which lies outwardly of the openings 42 also snugly seats within the notches 37 adjacent the spoke prongs 34. A riveting ring 44 is seated upon the hub reinforcement flange 40 and is provided with suitable openings through which the spoke prongs 34 extend. The ends of the spoke prongs 34 projecting beyond the ring 44 are riveted over so as to draw the spokes 32 in close contact with the reinforcing hub 31.

After the reinforcing spider is completely assembled in the manner just described, the same is embedded in a suitable composition body to complete the steering wheel structure.

The modified spoke structure just described functions very similar to the previously described structure, particularly since the reinforcing spokes 32 are rigidly secured to the reinforcing hub 31 at spaced points in different planes, it being understood of course that the prongs 35 may be riveted over the horizontal portion 41 of the hub 31 or they may be welded or otherwise secured thereto if desired.

It is clearly apparent to those experienced in the art that the present invention provides a very simple, and extremely rigid steering wheel construction which can be economically manufactured because of the simplicity of the reinforcing members.

It is to be noted that a considerable saving in composition material is effected by the use of the tubular rim reinforcing member shown in the drawings.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In a composition steering wheel, metallic spoke reinforcements embedded in the spokes thereof, a metallic hub reinforcement embedded in the hub thereof, each of said spoke reinforcements being secured to said hub reinforcement at axially and laterally spaced points, and a body of composition material molded around all of said reinforcements.

2. In a composition steering wheel having a hub, a rim, and spokes interconnecting said hub and rim, a metallic reinforcing ring embedded in said rim, an annular metallic member embedded in said hub, and a plurality of metallic spoke members embedded in said spokes, each of said spoke members being secured to said ring at their outer ends and being secured at their inner ends to said annular member at axially and laterally spaced points.

3. In a composition steering wheel having a hub, a rim, and spokes interconnecting said hub and rim, a metallic hub reinforcing member embedded in said hub and having laterally and axially spaced lateral portions, and a plurality of spoke reinforcing members embedded in said spokes, each of said spokes having portions extending through and secured to said laterally and axially spaced lateral portions.

4. In a composition steering wheel having a hub, a rim, and spokes interconnecting said hub and rim, a hub reinforcing member embedded in said hub and having a pair of spaced interconnected lateral portions offset from each other, and a plurality of spoke reinforcing members embedded in said spokes, each of said spoke reinforcing members comprising a pair of bars rigidly secured together, the inner end of one of said bars being seated against and extending through one of said lateral portions and the inner end of the other of said bars being seated against and extending through the other of said lateral portions of said hub reinforcing member.

5. In a composition steering wheel having a hub, a rim, and spokes interconnecting said hub and rim, a hub reinforcing member embedded in said hub and having a pair of spaced interconnected lateral portions offset from each other, and a plurality of spoke reinforcing members embedded in said spokes, each of said spoke reinforcing members comprising a pair of bars rigidly secured together, the inner end of one of said bars having an axial leg extending through one of said lateral portions of said hub reinforcing member, and the inner end of the other of said bars being spaced from said first mentioned end and having an axial leg extending through the other of said lateral portions of said hub reinforcing member.

6. In a composition steering wheel having a hub, a rim, and spokes interconnecting said hub and rim, a hub reinforcing member embedded in said hub and having a pair of spaced circumferential lateral portions and an annular wall interconnecting said lateral portions, and a plurality of spoke reinforcing members embedded in said spokes, each of said spoke reinforcing members comprising a pair of bars rigidly secured together, the inner end of one of said bars having an axial leg extending through one of said lateral portions of said hub reinforcing member, and the inner end of the other of said legs being spaced from said first mentioned end and having an axial leg extending through the other of said lateral portions of said hub reinforcing member, said legs of said ends being abutted against opposite sides of said annular wall of said hub reinforcing member.

7. In a composition steering wheel having a hub, a rim, and spokes interconnecting said hub and rim, a tubular rim reinforcing member embedded in said rim and having spaced depressions on opposite sides thereof, and a plurality of spoke reinforcing members embedded in said spokes, each of said spokes comprising a pair of bars rigidly secured together and having their outer ends separated from each other and secured in said depressions in said rim reinforcing members.

In testimony whereof I affix my signature.

HERMAN T. KRAFT.